March 16, 1954 G. GORHAM 2,672,581
AUTOMATIC MOTOR CONTROL FOR FRACTION-COLLECTION APPARATUS
Original Filed Sept. 5, 1947 8 Sheets-Sheet 1

March 16, 1954 G. GORHAM 2,672,581
AUTOMATIC MOTOR CONTROL FOR FRACTION-COLLECTION APPARATUS
Original Filed Sept. 5, 1947 8 Sheets-Sheet 2

INVENTOR.
GEORGE GORHAM
BY Edwin Lerroh +
Harry Coe
ATTORNEYS

March 16, 1954 G. GORHAM 2,672,581
AUTOMATIC MOTOR CONTROL FOR FRACTION-COLLECTION APPARATUS
Original Filed Sept. 5, 1947 8 Sheets-Sheet 3
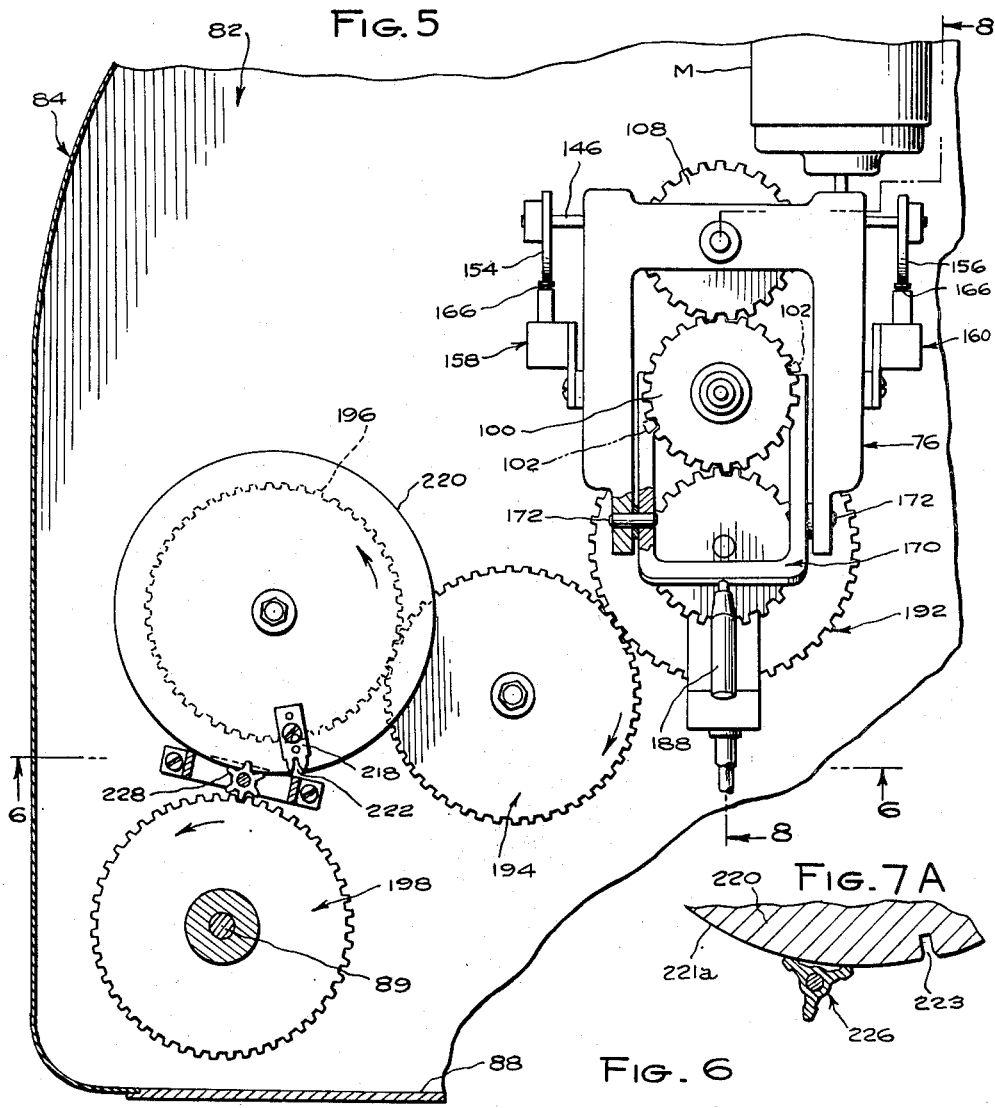
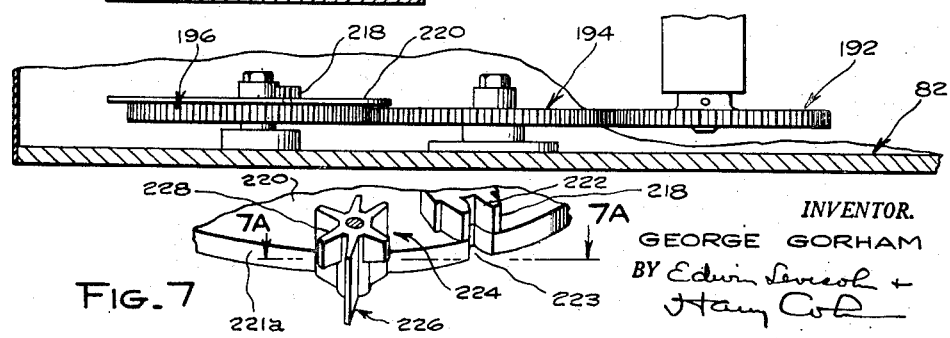
INVENTOR.
GEORGE GORHAM
BY Edwin Levison +
Harry Cole
ATTORNEYS

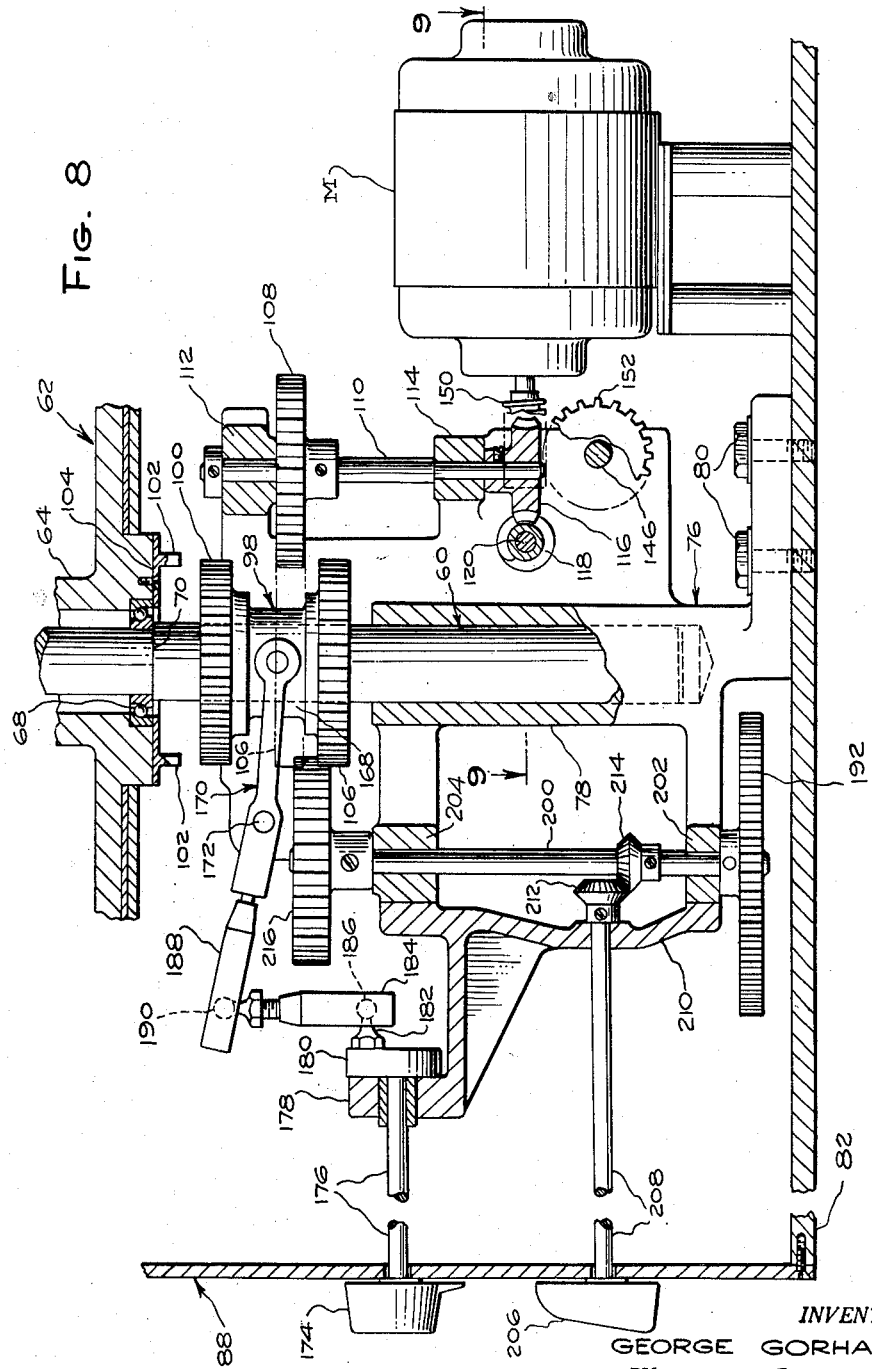

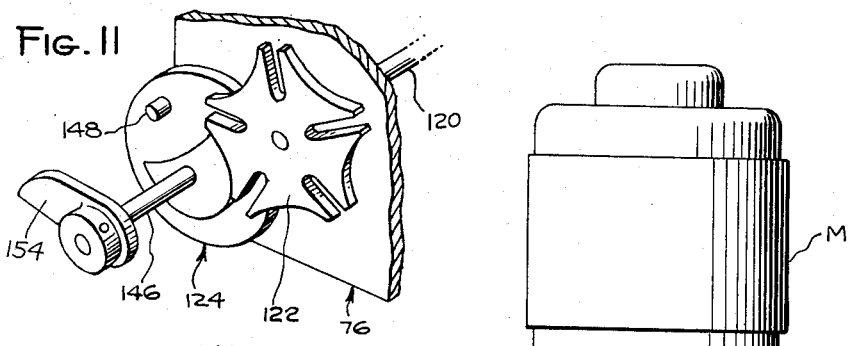
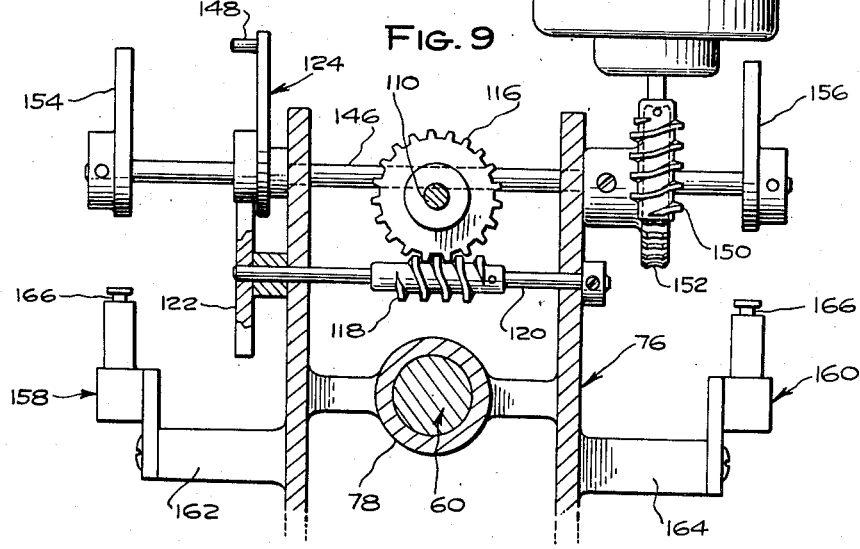
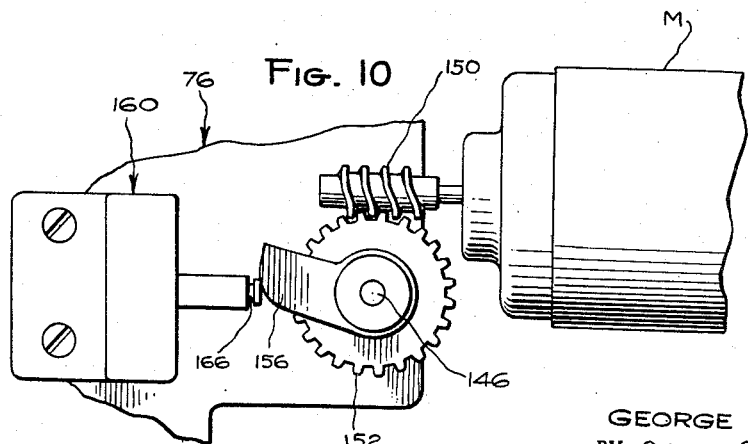

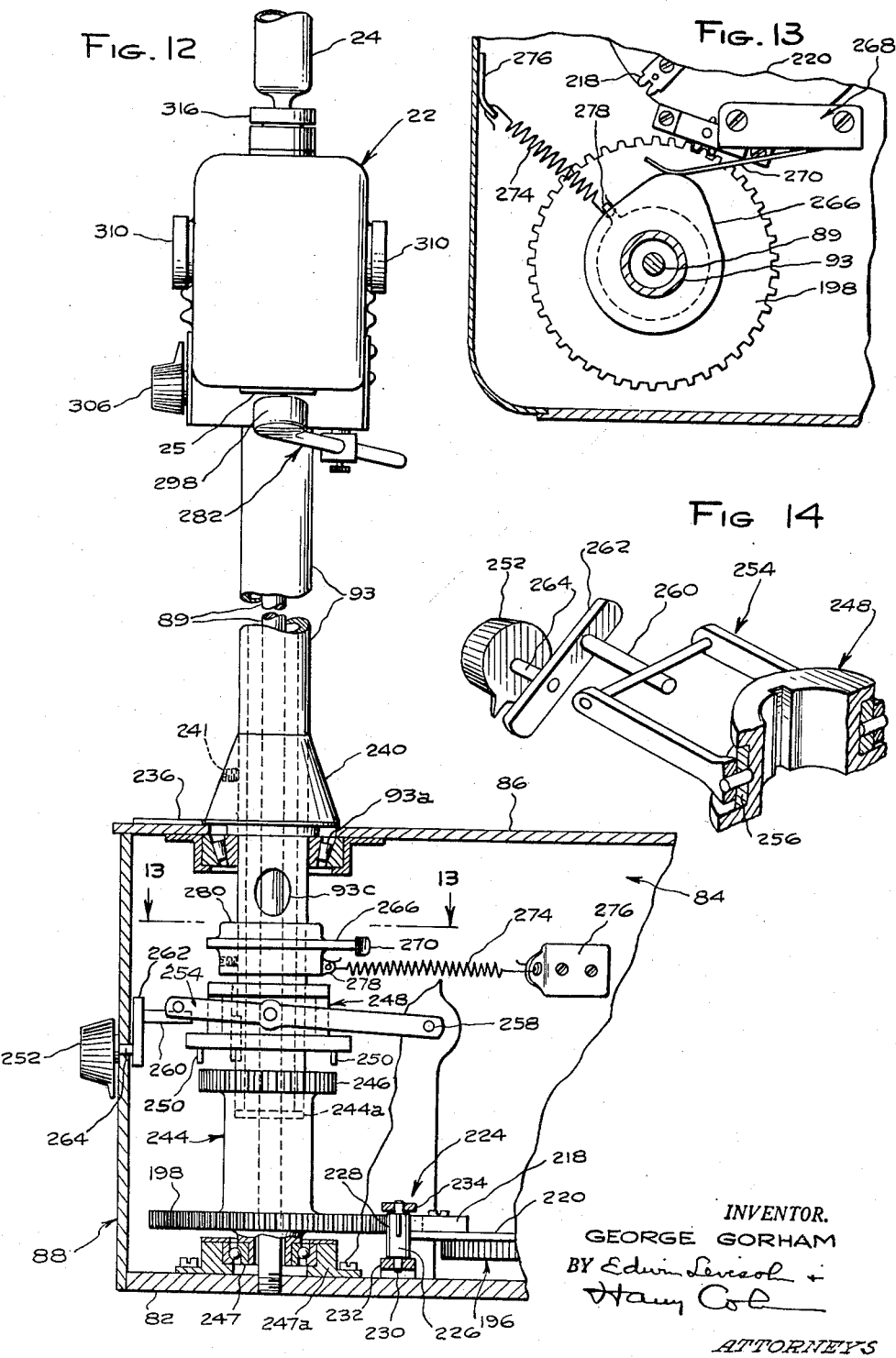

March 16, 1954 G. GORHAM 2,672,581
AUTOMATIC MOTOR CONTROL FOR FRACTION-COLLECTION APPARATUS
Original Filed Sept. 5, 1947 8 Sheets-Sheet 7
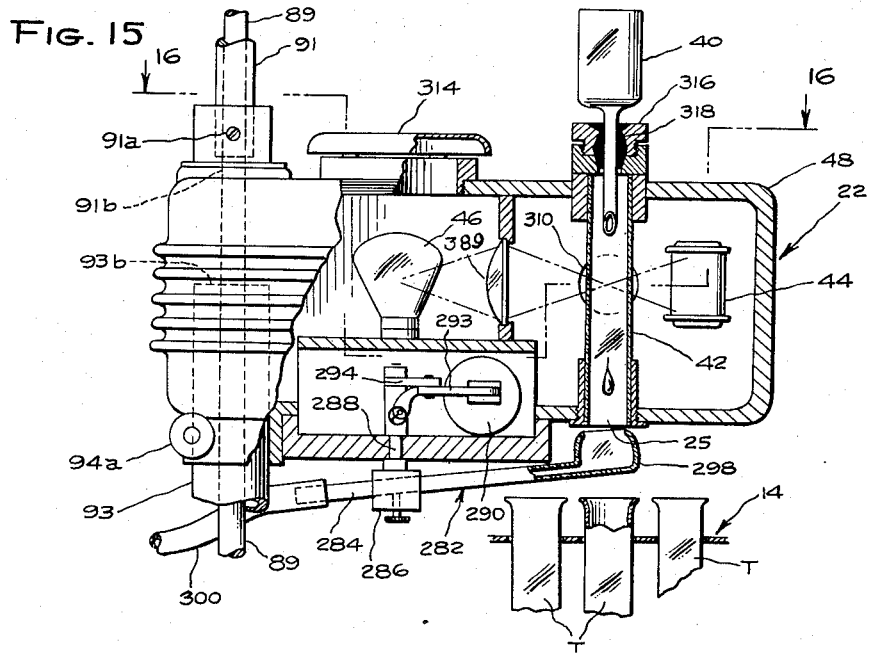
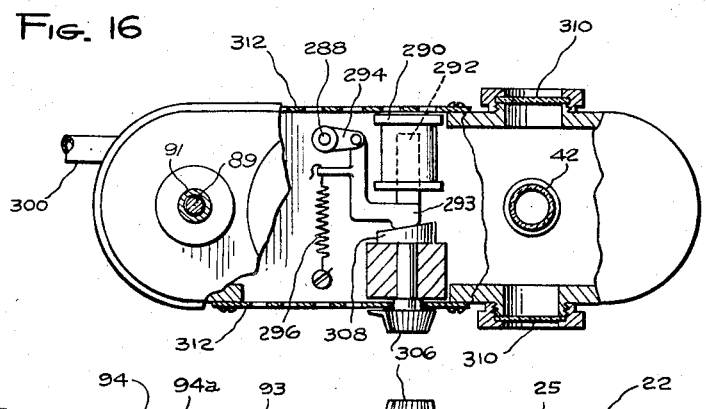
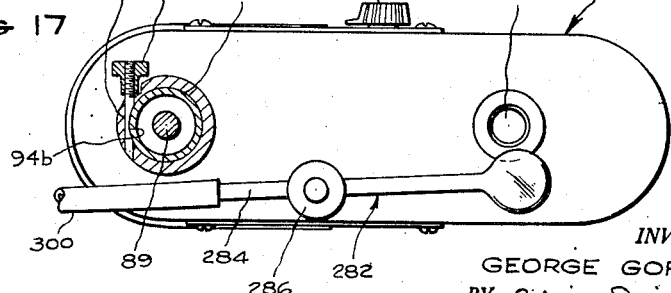
INVENTOR.
GEORGE GORHAM
BY
ATTORNEYS

March 16, 1954
G. GORHAM
2,672,581
AUTOMATIC MOTOR CONTROL FOR FRACTION-COLLECTION APPARATUS Original Filed Sept. 5, 1947

INVENTOR.
GEORGE GORHAM
BY Edwin Levisohn +
Harry Cohen
ATTORNEYS

Patented Mar. 16, 1954

2,672,581

UNITED STATES PATENT OFFICE 2,672,581

AUTOMATIC MOTOR CONTROL FOR FRACTION-COLLECTION APPARATUS

George Gorham, New York, N. Y., assignor to Technicon Chromatography Corporation, New York, N. Y., a corporation of New York Original application September 5, 1947, Serial No. 772,389. Divided and this application March 29, 1951, Serial No. 218,187

19 Claims. (Cl. 318—15)

This invention relates to an automatic fraction-collection apparatus.

The primary object of the present invention is the provision of an automatically operable apparatus which is well adapted to supply a large number of individual receptacles with accurately measured quantities or fractions of liquid or other fluent substance. The apparatus of the present invention is intended primarily for use as a fraction-collector in chromatographic analysis, but it will be understood that the apparatus embodying the present invention may be used for other purposes.

The invention and the above mentioned and other objects, features and advantages thereof will be fully understood from the following description considered in connection with the accompanying illustrative drawings.

In the drawings:

Fig. 5 is a sectional view on the line 5—5 of Fig. 1;

Fig. 6 is a sectional view on the line 6—6 of Fig. 5;

Fig. 7 is a detailed perspective view of a part of the apparatus;

Fig. 7A is a sectional view on the line 7A—7A of Fig. 7;

Fig. 8 is a vertical sectional view on the line 8—8 of Fig. 5;

Fig. 9 is a horizontal sectional view on the line 9—9 of Fig. 8;

Fig. 10 is a side view of certain of the parts of the apparatus;

Fig. 11 is a perspective view of a mechanism forming part of the apparatus;

Fig. 12 is a sectional view on the line 12—12 of Fig. 2 with parts shown in elevation;

Fig. 13 is a sectional view on the line 13—13 of Fig. 12;

Fig. 14 is a perspective view of a mechanism forming part of the apparatus, certain parts of said mechanism being shown in section;

Fig. 15 is a view partly in elevation and partly in section;

Fig. 16 is a sectional view on the line 16—16 of Fig. 15;

Fig. 17 is a bottom view of the control unit;

Figure 1:
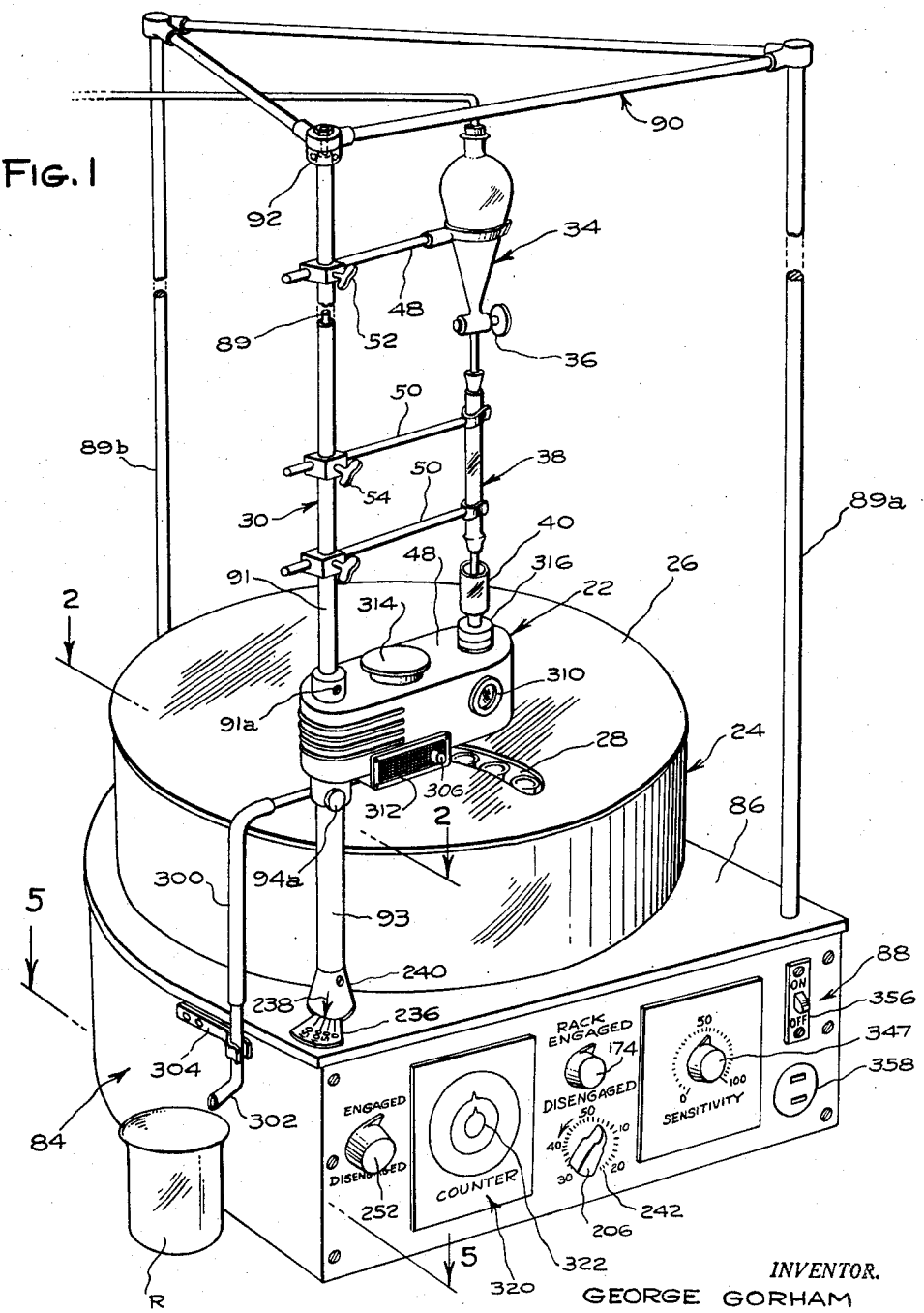
Fig. 1 is a perspective view of an automatic fraction-collector apparatus embodying the present invention.

Briefly described, the apparatus of the present invention comprises a movable rack on which a plurality of receptacles are arranged in each of a plurality of laterally related rows each of which extends in the direction of movement of the rack. A control device having a passage therethrough for the liquid or other substance which is to be supplied to said receptacles is mounted for movement laterally of the receptacle-rows of the rack. The rack is moved step by step to carry each receptacle to a position at the outlet of the control device for the supply of the substance to each receptacle. When the substance is to be supplied to more than one row of receptacles, the control device is moved automatically from one row to another. Indexing mechanisms are provided for predetermining the number of receptacles which are to be supplied with the substance, and means including a timing device or counter are provided for accurately determining and measuring the quantity of substance to be supplied to each of said predetermined number of receptacles. An electric motor is utilized for actuating the rack-moving mechanism and for operating the indexing mechanisms after the latter have been manually adjusted or set to determine the number of receptacles to be supplied or charged with the substance, whereby the operation of the apparatus is terminated as soon as the last receptacle is charged. The motor is stationary during the time each receptacle is being charged and as soon as it has received its predetermined charge or quantity of the particular substance, the motor is operated, under the control of the timing device, to move the rack another step for presenting the next receptacle in position to receive its charge. The apparatus preferably includes means to interrupt the supply of the substance to any one of the receptacles in case of defective operation of the apparatus and also at the end of the predetermined number of rack movements as set by the indexing mechanism.

The apparatus, in the form herein described, was specifically designed for a use as a fraction collector in chromatographic analysis. See for example, "Principles and Practice of Chromatography" by Zechmeister and Cholnoky, Translated by Bachrach and Robinson, published by John Wiley & Sons, Inc., New York. In this particular use of the apparatus a liquid is passed through or in contact with an absorbent substance of the column in a tube, according to known practice in the art of chromatography, and issues from the outlet of said tube drop by drop, and similarly passes, drop by drop, through the passage of the above mentioned control device. A photo-electric cell is disposed in said control unit and is operable, in response to the intermittent interruption of light by said drops, to control a relay which in turn controls the supply of electric pulses to the above mentioned counter whereby to measure the quantity of liquid supplied to each of the receptacles. It will be understood that the duration of the interval between two successive movements of the rack determines the quantity of liquid supplied to each receptacle, and that this interval of rest of the rack is controlled by the counter which, as explained above, controls the operations of the motor which moves the rack.

The apparatus will now be described in detail with reference to the above mentioned use thereof, but it will be understood that it may be used for other purposes.

Figure 2:
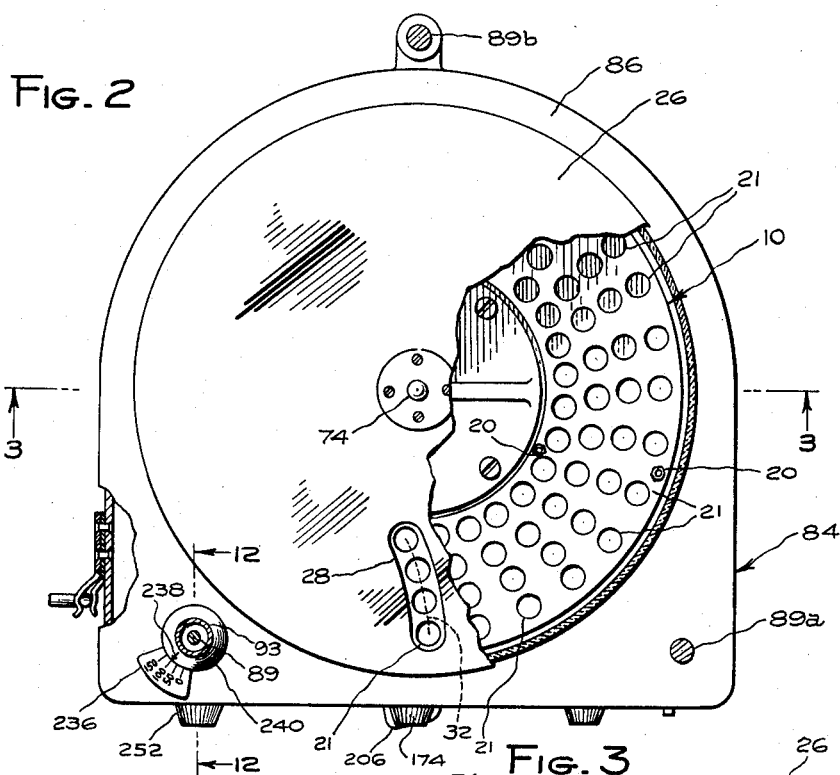
Fig. 2 is a plan view, partly in section on the line 2—2 of Fig. 1, with parts cut away for the purpose of illustration.
Figure 3:
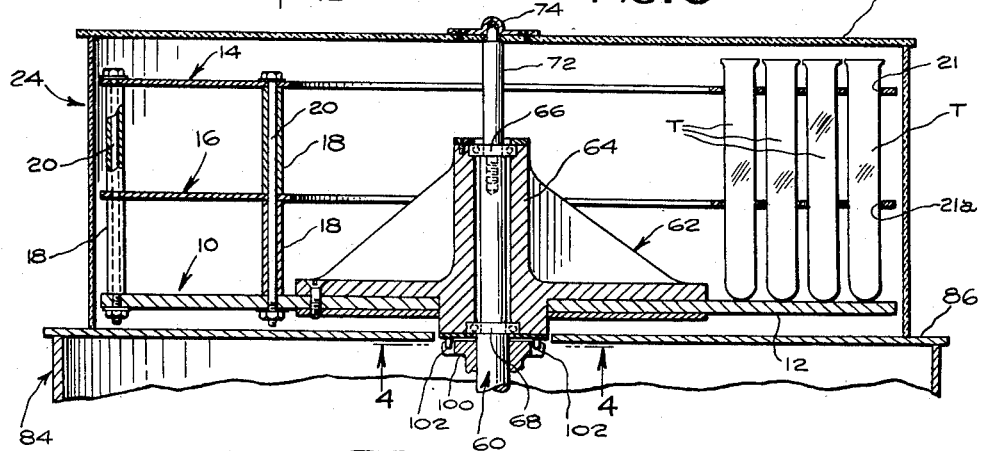
Fig. 3 is a vertical sectional view on the line 3—3 of Fig. 2.

In the use to which the apparatus is presently being put, accurately measured uniform quantities of liquid are collected in a multiplicity of test tubes or other suitable receptacles or containers which, in the form of the apparatus herein disclosed, are carried by a rotatable rack 10 (Figs. 2 and 3). The liquid receiving receptacles or containers, a few of which are indicated at T in Fig. 3, are disposed in each of a plurality of laterally related rows, here shown as circular rows, the rack or container-supporting means 10 being circular. The containers rest on the bottom 12 of the rack and are held removably in upright position and in uniform circumferentially spaced relations in each row by the horizontal plates 14 and 16 which are secured in vertically spaced relation, by the spacing sleeves 18 and companion bolts 20. For this purpose plate 14 is provided with a plurality of circumferentially spaced openings 21 for the outermost row of containers, and similar openings are provided in plate 14 for each of the other rows, there being four of such rows, in the apparatus as now constructed, as shown in Fig. 2. The lower plate 16 is similarly provided with four circular rows of circumferentially spaced openings as indicated at 21a in Fig. 3, the openings in each row being in registry with the openings in the respective rows of plate 14.

Rack 10 is mounted for rotation about a vertical axis, as hereinafter more particularly described, and is moved intermittently, i. e., stepwise, for presenting each of the containers of each row successively at the liquid-receiving station at which the material-supply device and control unit 22 (Fig. 1) is mounted. It will be noted that the rack is disposed within a stationary housing 24 provided with a removable cover 26 and that the latter has a slot or opening 28 to allow the passage of the liquid from the outlet 25 of unit 22 into the receptacle T at the liquid receiving station. The supply device and control unit 22 is mounted for controlled step movement laterally of the rows of containers into positions in which the liquid outlet 25 of said control unit registers with the containers in each of the laterally related rows, respectively, of the rack. More particularly, the control unit 22 may be first positioned in registry with the outermost row of containers so as to supply liquid to each of the containers in said outermost row during one revolution of rack 10, after which the control unit 22 is moved in succession, inwardly toward the center of the rack, to the other rows for supplying liquid to each of the containers of each of said other rows during the next three revolutions of the rack.

The supply and control unit 22 is mounted on a vertical post 30 and turns with the latter about the vertical axis of said post in moving from one row of containers or receptacles T to each of said other rows. Accordingly, the outlet 25 of the control unit 22 moves in an arcuate path in the movement of the control unit from one row of receptacles to another. In this connection, it will be noted that opening 28 is arcuately shaped and has its center of curvature at the axis of post 30, and further it will be observed that as clearly shown in Fig. 2 the laterally aligned openings in plates 14 and 16 are disposed along the arc of a circle which has its center at the axis of post 30 when each set of laterally related openings of the several rows are at the liquid-receiving station as indicated in dotted lines at 32 in Fig. 2.

As illustrated in Fig. 1, the liquid which is supplied to the receptacles on the rack 10 is provided in a supply container 34 having an adjustable valve 36 at its outlet from which the liquid flows through a tube 38 of the column for treatment by a substance contained therein, depending upon the process for which the apparatus is to be used. From the outlet of the tube 38 the liquid flows intermittently, i. e., drop by drop, the drops being of the same volumetric size, into the funnel 40 carried by the control unit 22. The drops of liquid pass through a transparent glass tube 42 which forms a liquid or material-supply passage in the control unit 22 (Fig. 15) located between a photo-electric cell 44 and a companion exciter lamp 46 mounted within the casing 48 of said control unit. As each drop of liquid passes across the path of light from the lamp 46 to the photo-electric cell 44, a relay, subsequently described, is operable under the control of said photo-electric cell and mechanism, subsequently described, operates under the control of said relay, after the predetermined drops of liquid are supplied to the test tube at the liquid receiving station, to turn the rack 10 one step whereby to bring the next test tube into position at the liquid receiving station. More particularly, the passage of each drop of liquid between the photo-electric cell and the exciter lamp 46 interrupts the light to the cell and initiates an electric impulse which is transmitted to a suitable impulse counter mechanism which is adjustable and may be pre-set so as to automatically control the intermittent movement of rack 10. Supply container 34 and column tube 38 move as a unit with control unit 22. For this purpose container 34 and tube 38 are carried by supports 48 and 50, respectively, which are releasably secured to post 30 in any suitable way as by clamping screws 52 and 54, respectively.

Rack 10 is turned intermittently in order to carry the liquid-receiving receptacles T successively to the liquid-receiving station and allow sufficient time of each receptacle at said station to receive a predetermined quantity or charge of liquid. After all of the receptacles in one row are supplied with the predetermined quantities of liquid, the control unit is moved automatically to the next row. In the apparatus which has already been constructed and operated pursuant to the present invention, there is provision for 50 test tubes in each of the four rows, or a total of 200 test tubes. As will hereinafter be explained, the apparatus may be set so as to supply a predetermined quantity of liquid to all of the 200 test tubes or to any predetermined smaller number of test tubes, according to requirements.

Rack 10 is mounted for turning movement on a stationary vertical shaft 60 (Figs. 3 and 8). Said rack is secured to a casting 62 having a hub 64. Bearings 66 and 68 are provided for antifriction purposes between the rack and the shaft 60. As shown in Fig. 8 casting 62 which carries the rack is supported on the horizontal shoulder 70 of shaft 60. When the cover 26 is removed, the rack may be removed from the shaft. Thus, it will be noted that the rack is conveniently portable. A pin 72 is threaded into the upper end of shaft 60, as shown in Fig. 3, and cover 26 is provided with a central recessed part 74 which engages the upper end of said pin for centering the cover on the rack housing 24. Any suitable means (not shown) may be provided on the cover and on the housing so as to position the cover with the opening 28 thereof in register with the liquid outlet 25 of the control unit 22.

Stationary shaft 60 is mounted in upright position in a frame 76 (Figs. 8 and 9) and more particularly in a fixed cylindrical part 78 of said frame. The frame is rigidly secured in any suitable way, as by screws 80, to the bottom 82 of the base 84 which as here shown is in the form of a housing for the mechanism mounted in said base. The top 86 of said housing provides a support for the rack housing 24. As shown in Fig. 3 housing 24 is preferably made of transparent material so that the receptacles and the contents thereof may be inspected without requiring removal of the rack from its housing. The front of the base-housing 84 is normally closed by a removable wall member 88 which provides a control panel for the various manually operable control devices provided in the apparatus as hereinafter described.

Stationary rods 89a and 89b are secured at their lower ends to base 84 and are connected at their upper ends by a triangular frame member 90. Post 30 on which device 22 is mounted is formed in sections and comprises as one section thereof an upper tube or sleeve 91 having a rotary bearing 92 at a corner of frame member 90 the lower end portion of tube 91 having unit 22 secured adjustably thereto in any suitable way, as by a set screw 91a. The other section of post 30 comprises a tube or sleeve 93 which has a rotary bearing 93a (Fig. 12) at the top of base 84 by which sleeve 93 is supported in upright position. The upper end portion of sleeve 93 projects into unit 22 and the latter is secured adjustably to said upper end portion in any suitable way as by pin 94 and the take-up nut 94a (Fig. 17). Pin 94 has an arcuate recess 94b which engages the upper end portion of sleeve 93. By threading nut 94a on pin 94 against the adjacent portion of unit 22, the arcuate portion 94b or pin 94 is clamped against the upper end portion of sleeve 93 whereby to secure unit 22 to said sleeve. It will be noted that sleeves 91 and 93 are of larger diameter than rod 89 so that post 30 may turn around its longitudinal axis around said stationary rod without engaging the latter. The upper end 93b of sleeve 93 is spaced from the lower end 91b of sleeve 91 and is open within the casing of unit 22. An opening 93c is provided in the side of sleeve 93 at the lower part thereof within the housing of base 84. Said opening 93c and the open upper end of sleeve 93 provide for the electric wires (not shown) to photo-electric cell 44 and lamp 46, as well as to other electrical devices in unit 22. It will be understood that the electric wires extend through sleeve 93 in the space between the latter and rod 89 and have their terminals in unit 22 and the housing of base 84.

Figure 4:
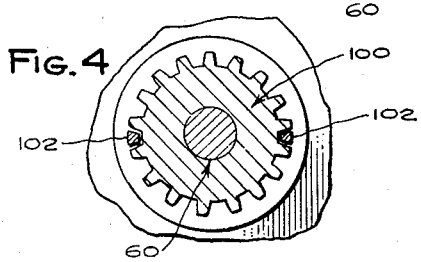
Fig. 4 is a sectional view on the line 4—4 of Fig. 3.

The mechanism for turning rack 10 comprises the gear unit 98 which is mounted for sliding movement longitudinally of stationary shaft 60 and for rotation about the axis of said shaft. Said gear unit comprises a gear 100 which is releasably engageable with the teeth or projections 102 (Figs. 3, 4 and 8) fixed to the rack-carrying member 62. More particularly, as here shown, teeth 102 are fixed to a plate 104 which is rigidly fastened to rack-carrying part 62 as shown in Fig. 8. Teeth 102 are slidably engageable with the teeth of gear 100 axially of said gear in the grooves between said gear teeth but are not otherwise movable in relation to said gear teeth when said gear engages teeth 102. Gear unit 98 also includes a gear 106 which meshes with a driving gear 108 when gear 100 of said gear unit is in driving engagement with the teeth 102 of the rack-carrying member 62. Gear 108 is fixed to and rotated by a shaft 110 which is journaled for rotation in the parts 112 and 114 of frame 76. Said shaft 110 is provided with an actuating gear 116 driven by a worm 118 carried by a shaft 120 journaled for rotation in frame 76 (Figs. 8 and 9). A Geneva gear mechanism is provided for turning shaft 120 intermittently whereby to turn rack 10 one step at a time during the operation of the apparatus. The Geneva gear mechanism comprises the Geneva gear 122, which is fixed to shaft 120, and the cooperating gear device 124 of the Geneva gear movement, said cooperating Geneva gear device being fixed to a rotatable shaft 146 which is mounted for rotation in frame 76. It will be noted that, as usual, the cooperating gear device 124 of the Geneva gear movement includes a pin 148 which is engageable in the circumferentially spaced radial slots of the Geneva gear 122 for turning the latter intermittently during the rotation of shaft 146. Shaft 146 is actuated by an electric motor M which has a driving connection with said shaft by the worm 150 rotated by the shaft of said motor and by the cooperating worm wheel or gear 152 fixed to shaft 146.

Switch-operating mechanisms here shown as cams 154 and 156 are fixed to and rotated by shaft 146 for momentarily closing normally open switches 158 and 160, respectively, which are mounted on brackets 162 and 164 carried by frame 76. Said switches are preferably of the micro-switch type, but may be of any other type, and each includes a pin 166 which is engaged by the cams 154 and 156, respectively, for momentarily closing the normally open contacts of the switches. These switches cooperate with other devices hereinafter described for controlling the operation of motor M. The arrangement and relation between the parts of the motor-operated mechanisms is such that shaft 146 makes only one revolution during each operation of the motor under the control of switches 158 and 160 and the associated control devices hereinafter to be described in detail. It will be understood that when gear 100 is in driving engagement with rack 10, the operation of motor M is such as to turn the rack precisely the angular distance required to bring the liquid-receiving receptacles T in succession, in each row, to the liquid-receiving station at which control unit 22 is positioned, so that during the successive movements of the rack all of the liquid-receiving receptacles of each row are presented at the liquid-receiving station, in succession, and are there held for a sufficient length of time to receive therein a predetermined, accurately measured quantity of liquid.

Provision is made for moving gear unit 98 longitudinally of shaft 60 for engaging gears 100 and 106 with rack 10 and driving gear 108 respectively and for disengaging the gears of said unit from said rack and from said driving gear. For this purpose gear unit 98 includes a gear-shift sleeve 168 which is interposed between gears 100 and 106 in fixed relation thereto for operation by a gear-shift fork 170 which is mounted for pivotal movement in frame 76 by the pivot pins 172. Gear-shift fork 170 is operated by a rotary control knob 174 disposed at the front of control panel 88. Said knob is fixed to a rotary shaft 176 journaled in a bearing portion 178 of frame 76. A crank 180 is fixed to shaft 176 and is provided with a crank pin 182 which engages a link 184, there being a universal or ball and socket joint 186 between said crank pin and link. The upper end of link 184 is connected to a rod 188 which is fixed to the cross arm of gear shift fork 170, there being a universal or ball and socket joint 190 between said link and said rod.

Indexing mechanisms are provided in the apparatus for predetermining the number of receptacles, up to the capacity of the apparatus, to be supplied with liquid during the operation of the apparatus. The indexing mechanisms include the gears 192, 194, 196, and 198 and associated devices which will be referred to as the description proceeds. Gear 192 is fixed to a shaft 200 which is journaled for rotation in the bearing portions 202 and 204 of frame 76. Gear 192 meshes with gear 194 and the latter meshes with gear 196. Each of said gears 192, 194, 196 has 50 teeth, corresponding to the number of liquid receiving receptacles in each receptacle-row of rack 10, so that one complete revolution of the rack is accompanied by one complete revolution of each of said gears. Shaft 200 may be turned by a control or indexing knob 206 disposed at the front of panel 88. Said control knob is fixed to shaft 208 journaled for turning movement in part 210 of frame 76. Said shaft 208 is provided with bevel gear 212, and a companion bevel gear 214 is fixed to shaft 200 whereby turning of shaft 208 by knob 206 is effective to turn shaft 200. A gear 216 is fixed to shaft 200 for turning the latter, said gear 216 being at all times in mesh with gear 106 of gear unit 98. It will be understood that when gear 106 is in mesh with gear 108 the latter is operatively connected to shaft 200 for turning the latter and that this turning movement of shaft 200 by gear 108 through gears 106 and 216, occurs during each partial rotary or step movement of the rack 10, by gear 108 operating through gear 100 and the companion teeth 102 of the rack.

Gear member 198 is arranged to be operatively connected to sleeve 93 of post 30 for turning the latter a predetermined angular distance whereby to position the control unit 22, and more particularly the liquid outlet 25 of the latter, in registry with the next row of receptacles on the rack after all of the receptacles of the preceding row are supplied with liquid, assuming that more than 50 receptacles are to be supplied with liquid from the supply receptacle 34. Provision is made for turning gear 198 step-wise a predetermined distance under the control of gear 196 and for holding said gear 198 stationary except when operated by gear 196. For this purpose a gear element 218 is mounted in fixed relation to gear 196, for operation by the latter, said gear member 218 being securely but releasably fastened to plate 220 which is in fixed relation to and rotates with gear 196. As shown in Fig. 5 gear element 218 has only one tooth-receiving groove indicated at 222 in registry with a radial groove 223 which is open at the peripheral edge 221a of plate 221. A gear mechanism 224 shown more clearly in Figs. 5, 7A, 7 and 12 is arranged in position to be actuated by gear member 218 for turning gear 198. The gear mechanism 224 comprises, in fixed relation, a gear 226 having three teeth and a gear 228 having six teeth. These gears may be made in one piece and are fixed on a shaft 230 carried by the fixed bracket plates 232 and 234. It will be observed that gear 228 is at all times in mesh with gear 198 but that gear 228 and gear member 218 are in such relation that during one complete rotation of gear 196 gear member 218 engages only one tooth of gear 228 and then disengages said gear completely, so that upon each operation of gear member 218, pursuant to rotation of the gear 196, gear 198 is rotated a predetermined angular distance for turning post 30 the same angular distance. Gear 226 in conjunction with plate 220 prevents gear 198 from turning except when gear 228 is actuated by member 218 after gear 196 is turned a predetermined distance depending upon the setting of the indexing gears by operation of indexing knob 206. As shown in Fig. 7A, gear 226 is disposed with two teeth thereof in face contact with the circular edge 221a of plate 221 at circumferentially spaced points, whereby gear device 224 is prevented from turning except when one of said edge-contacting teeth of gear 226 is in position at the entrance to groove 223 pursuant to the predetermined angular movement of plate 220 by gear 196. In the relative position of plate 220 and gear 226 at which one of the teeth of the latter can enter groove 223, gear 228 is engaged by gear member 218 and during the step-movement of gear 196 which then occurs gear member 218 turns gear 228 and thereby turns gear 198 one step through an angular distance determined by the gear ratio of gears 198 and 228. During this actuation of gear 228, gear 226 is correspondingly turned so that two teeth thereof are again disposed in contact with the circular edge of plate 220 whereby to prevent gears 228 and 198 from turning until plate 220 makes a complete revolution. It will be noted that gears 226 and 228 are of equal diameter so that an angular movement of gear 228 by gear member 218 always brings two teeth of gear 226 into contact with the edge 221a of plate 220 at points spaced circumferentially of the latter so that gear 226 cannot turn in either direction and hence prevents gear 198 from turning in either direction. Accordingly when gear 198 is operatively connected to sleeve 93 of post 30 of control unit 22, the latter is held in set position with respect to the receptacle-row of rack 10 and, in the operation of the apparatus, is prevented from moving from said position until gear 198 is actuated as just described. The mechanism comprising plate 220, member 218 and cooperating gear mechanisms 226, 228 operate as a lost motion mechanism so that the indexing gears may be turned up to one revolution without operating gear 198 thus providing for a complete revolution of rack 10, if required, according to the number of receptacles to be charged, before gear 198 is operated to turn post 30 for moving unit 22 from its position over one receptacle row to a position over the next receptacle row or to a position for interrupting the operation of the apparatus. The mechanism just referred to as operating as a lost motion mechanism or device also operates as described above to hold the control unit or material supply device 22 in its set position and prevents movement thereof until gear 198 has completed its predetermined movement in response to the number of step movements of rack 10 predetermined by setting of the indexing mechanism by knob 206 on the control panel.

Provision is made for operatively connecting gear 198 to post 30 and for disengaging said operative connection so that said post and the control unit 22 carried thereby may be turned, free of gear 198, for manually positioning the control unit 22 at the desired row of receptacles. More particularly, it will be understood that when the receptacles in all of the rows are to be supplied with liquid, unit 22 is positioned so that its liquid outlet 25 is in registry with the outermost receptacle-row of the rack. In order accurately to determine the position of the outlet 25 of the unit 22 in relation to any particular row of receptacles carried by the rack, depending upon the number of receptacles which are to be supplied with liquid, a stationary dial plate 236 is provided on the cover 86 of the mechanism housing or base 84 and a pointer 238 is provided on the part 240 which turns with the post 30. Part 240 is a conical member which is secured to sleeve 93 in any suitable way as by a set screw 241. As will be explained subsequently, the setting of the post so that pointer 238 indicates a corresponding reading on dial 236 and the setting of knob 206 in relation to the dial 242 on front panel 86 determine the number of receptacles which are to be supplied with liquid and also determine the time of termination of the operation of the apparatus following the initiation of said operation and the setting of the liquid measuring or timing device as later explained.

As indicated above, gear 198 is disengaged from its driving relation with post 30 to facilitate the turning of said post for positioning the control unit 22 manually in relation to the receptacle rows on the rack 10. After unit 22 is positioned, the driving relation between gear 198 and the post is restored. For thus engaging and disengaging gear 198 from its driving connection with post 30, the mechanism which will now be described is provided. This mechanism includes the unit 244 (Fig. 12) which carries gear 198 at its lower end and a gear 246 at its upper end. Said gear unit 244 is mounted for rotation co-axially with sleeve 93 of post 30 and for that purpose is provided with a rotary bearing 247 at its lower end whereby it is journalled for rotation in the support 247a fixed to base 82. The upper part of gear unit 244 has an inner cylindrical surface 244a in which the lower end portion of sleeve 93 is received in movable contact therewith. The gear 246 of unit 244, which is stationary longitudinally of rod 89, constitutes a clutch member which is releasably engageable by a movable clutch member 248 which is splined to sleeve 93 for movement longitudinally thereof and for rotation therewith. Clutch member 248 has a plurality of circumferentially spaced end projections or prongs 250 arranged to engage clutch member 248 in the spaces or grooves between the teeth of the latter. Prongs 250 have a sliding fit in the grooves between the teeth of gear 246 axially of the latter but do not otherwise move in relaion to said gear teeth when the clutch members are engaged.

A knob 252 is provided at the front of control panel 86 for operating a mechanism for moving clutch 248 into and out of engagement with clutch gear 246. This last-mentioned mechanism comprises a fork 254 which engages a collar 256 (Fig. 14) with respect to which clutch 248 may turn about the axis of post 30. Said fork is pivoted at one end thereof to a stationary part of the base as indicated at 258 in Fig. 12, and the opposite end of said fork is engaged by a crank pin 260 carried by the crank 262 which is fixed to and turnable by the shaft 264 to which knob 252 is secured. It will be understood that by turning the knob 252 so as to lower the crank pin 260, the weight of clutch 248 is sufficient to cause said clutch to move toward gear 246 for engagement of prongs 250 in the grooves of said gear, thus establishing a driving engagement between gear 198 and sleeve 93 of the post.

A cam 266 is fixed to sleeve 93 so as to turn therewith whereby to open a normally closed switch 268 for interrupting the main electric circuit, independently of all other circuit controls, and thus to terminate the operation of the apparatus when the post 30 has been turned a predetermined distance in a counterclockwise direction (as view from the top in Fig. 1) from its initially set position, after the predetermined number of receptacles are supplied with liquid pursuant to the setting of the post in relation to dial 236 and the setting of knob 206 in relation to dial 242. As shown in Fig. 13 cam 266 is arranged to engage a spring follower 270 which engages an actuating member of switch 268 for moving the movable contact member of the switch to its open position. Switch 268 is preferably of the micro-switch type, although it can be any suitable normally closed stop switch. A tension spring 274 is connected at one end thereof to a part 276 fixed to the base 84 and at its opposite end to an eye 278 which projects from the collar 280 which is in fixed relation to the post. Spring 274 tends to turn the post and the clutch 248 mounted thereon whereby to prevent lost motion between the clutch prongs 250 and the companion teeth of gear 246 when the clutch is engaged with said gear.

Provision is made in the apparatus for preventing the flow of liquid into any receptacle T at the end of the operation of the apparatus or in the event that the exciter lamp 46 of the photo-electric cell burns out or is not illuminated. For this purpose the control unit is provided with a liquid intercepting device 282 which is carried by the control unit 22 in position at the bottom thereof. Said intercepting device comprises a tube 284 mounted in a bracket 286 which is secured to a shaft 288. A normally energized solenoid 290 is arranged in the control circuit of the apparatus, as will be subsequently described in further detail with reference to the circuit diagram (Fig. 18), so that during the normal operation of the apparatus and before the termination of said operation said solenoid is energized and the solenoid core 292 which is connected by member 293 to the crank arm 294 of shaft 288 holds said shaft in a position in which the liquid-intercepting device 282 is in its retracted position out of registry with the liquid outlet 25, as shown in Fig. 17, so that the liquid may pass to the test tube or other receptacle in registry with said outlet. In the event, however, that the solenoid 290 is de-energized, at the end of the operation of the apparatus, or due to a defective control condition, spring 296 is effective to turn shaft 288 for moving the liquid intercepting device 282 so that the cup 298 at the liquid-receiving end of said device is brought into registry with the outlet 25 for thus intercepting the flow of liquid from said outlet to the receptacle T on the rack and for transmitting the intercepted liquid to a suitable collection receptacle indicated at R in Fig. 1. The tube 284 of the liquid intercepting device is connected by a rubber or other flexible tube 300 to an outlet fitting 302 releasably mounted on the vertical wall of the housing-base 84 in any suitable way as by a releasable spring clamp 304.

When solenoid 290 is de-energized and it is desired to move the liquid-intercepting device 282 to its retracted position (Fig. 17), a knob 306 may be turned for operating cam 308 to move part 293 for turning shaft 288. The control unit 22 is provided with viewing openings 310 at both sides thereof at opposite sides of the liquid passage 42, which is transparent, so that the passage of liquid through the control unit may be observed. Also, at opposite sides of the casing of the control unit there are perforated plates 312, and at the top of the casing there is a ventilating cap 314 as an off take for the heat of the exciter lamp 46. It will be noted that the funnel 40 is removably secured in position on the control unit by an externally threaded nut 316 which engages a split or compressible bushing 318 which grips the stem of the funnel, providing an adjustable securing device for funnels which may have stems of different diameters.

Summarizing the operation of the apparatus as thus far specifically described, it will be observed that if liquid is to be supplied to not more than 50 receptacles, post 30 is adjusted to position the control unit 22 with its liquid outlet in registry with the innermost receptacle row of rack 10, as determined by the position of the pointer 238 in relation to dial 236. This adjustment of post 30 is performed while clutch 248 is disengaged from gear 246 as indicated by the position of knob 252 when its pointer is at the legend "disengaged" on the control panel 88. After the post is adjusted knob 252 is turned to the "engaged" position, indicated on the control panel, 88, for engaging clutch 248 with the driving gear 246. Post 30 is held in this adjusted position by the engagement of gear 198 with gear 228 of gear unit 224 in conjunction with plate 220 until gear member 218 engages one of the teeth of gear 226 during the turning of indexing gear 196. The number of receptacles, in the innermost row, which are to be supplied with liquid is determined by operation of indexing knob 206 which is turned for operating indexing gear 192 while the rack is disengaged from gear 100 of shift-gear unit 93 and while gear 106 of said unit is disengaged from driving gear 108. It will be understood that for determining the number of receptacles of any particular row which are to be filled with liquid, knob 206 is turned in such direction as to turn gear 192 in a direction opposite to that in which said gear is turned when gear 106 is operated by the driving gear 108 at which times the rack is turned in the same direction by the engagement of gear 100 with said rack. If more than 50 and not more than 100 receptacles are to be supplied with liquid, post 30 is adjusted so that the liquid outlet 25 of the control unit is positioned in registry with the second innermost receptacle-row of the rack, and knob 206 is adjusted to position the indexing gears for determining the number of receptacles in that particular row which are to be supplied with liquid. When the post 30 and knob 206 are adjusted for the particular number of receptacles, the post remains stationary until the selected number of receptacles in the second innermost row are supplied with liquid, whereupon post 30 is turned automatically by the operation of gear 218 on gear member 228 to turn the post so as to position the outlet 25 of the control unit into registry with the innermost receptacle row of the rack. It will be obvious that if more than 100 and not more than 150 receptacles are to be supplied with liquid post 30 is adjusted so that its liquid outlet is positioned in registry with the second outermost receptacle row of the rack and that knob 206 is adjusted for determining the exact number of receptacles within this range; and likewise it is obvious that if more than 150 receptacles are to be supplied with liquid post 30 is adjusted so that the liquid outlet 25 of the control unit is in registry with the outermost receptacle row of the rack and knob 206 is adjusted for determining the exact number of receptacles, between 150 and 200, to be supplied with liquid.

Figure 18:
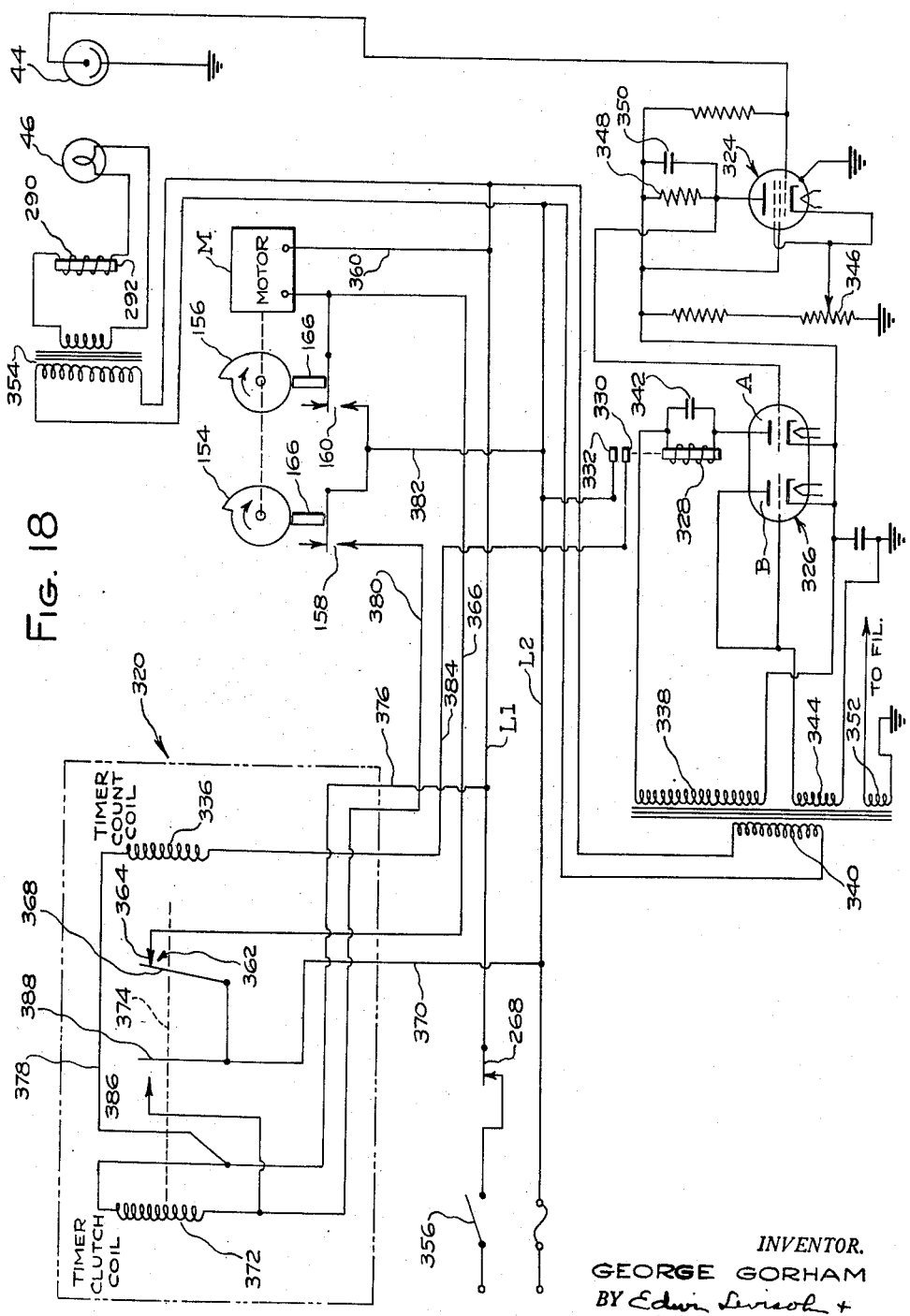
Fig. 18 is a circuit diagram of the electrical and electronic devices of the apparatus.

It is apparent from the above description that when the rate of flow of liquid through the control unit is adjusted so that said rate of flow is uniformly constant, the quantity of liquid which is supplied to each receptacle is determined by the length of time during which that particular receptacle is held stationary in position under the liquid outlet 25 of the control unit and this length of time is the same as the duration of the period during which the rack is stationary, that is, the length of time between two successive operations of motor M. This length of time may be predetermined by any suitable timing device but in the present instance in view of the drop-by-drop supply of liquid, the timing device is of the type which operates as a drop counter. This timing device indicated at 320 is mounted on control panel 88 and has a suitably calibrated dial and a time-adjusting knob 322. The timing device or counter may be of any suitable type, and since it is not in itself part of the present invention it is not herein described specifically, but certain parts thereof are hereinafter referred to in explaining the operation of the apparatus. The counter or timing device utilized in the apparatus as actually constructed and operated is an instantaneous reset counter of the type described in U. S. Patent No. 2,329,447 and was supplied by Eagle Signal Corporation, Moline, Illinois. When a start switch, in this case switch 158 (Figs. 9 and 18), is closed, a clutch coil, i. e., a coil of an electro-magnetically operated clutch, is engaged and impulses transmitted to a count or ratchet-operating coil of an electro-magnet are effective to operate the ratchet, and when the clutch coil is de-energized, the counter is automatically reset to its starting position. The count coil and the ratchet operated thereby take the place of the synchronous or clock motor 22 of said patent for operating the timer shaft 25 of said patent, and the switch connections in the circuit are modified as required, as indicated in Fig. 18, as will be readily apparent. The clutch coil and count coil and the switching connections are schematically shown in Fig. 18 and will be presently more particularly referred to in the description of the operation of the apparatus.

As shown in Fig. 18, the photo-electric cell 44 of control unit 22 is connected to the electronic tube 324, which as here shown is a 6SJ7 tube, in an electronic-relay circuit. This tube is biased so that it is normally non-conducting but becomes conducting under the control of photo-electric cell 44 each time a drop of liquid passes between said cell and the exciter lamp 46 and cuts off the light from said lamp to said cell. An electronic tube 326, here shown as a 6SN7 tube, has an electronic discharge system therein connected to the winding of magnetic relay 328 and operable under the control of tube 324. The section of tube 326 which is connected to relay 328 and tube 324 is indicated at A. This section is normally conducting and energizes the winding of relay 328 so that the contacts 330 and 332 of said relay are normally open. When a pulse is received by tube 324, section A of tube 326 becomes non-conducting and as a result the winding of relay 328 is deenergized and contacts 330 and 332 of said relay close so that a pulse is sent to the count or ratchet-operating coil 336 of the timing device 320. Power for the relay circuit is provided by the transformer secondary winding 338, the primary winding 340 of said transformer being connected to the supply line L1 and L2 which receive alternating current from a suitable source. Tube 326 conducts current only during the positive half of the alternating current cycle, so that a pulsating current flows through the relay circuit. Accordingly, a condenser 342 is provided to smooth the voltage across the winding of relay 328 so as to prevent it from following the frequency of the current through the tube. The section B of tube 326 constitutes a half-wave rectifier for the current supplied by the transformer secondary winding 344. The sensitivity control provided by the adjustable resistance 346 is adjusted by the knob 347 on control panel 88, so that the effect of the light from lamp 46 on photo-electric cell 44 causes the grid of tube 324 to be negative with respect to the cathode, whereby plate current through said tube is cut off as a result of this negative bias. The grid-cathode of section A of tube 326 is connected across the resistor 348 in the plate circuit of tube 324. The voltage drop across this resistor acts as a bias voltage to the grid of section A of tube 326, but since voltage across this resistor is normally zero the flow of plate current in section A of tube 326 takes place so that the winding of relay 328 is normally energized as hereinbefore indicated. When light on the photo-electric cell 44 is interrupted upon the passage of a drop of liquid across the light beam from lamp 46 to said photo-electric cell, the negative bias on the grid of the tube 324 is decreased and the plate circuit of said tube conducts current whereby the voltage drop across resistor 348 produces a negative bias across the grid-cathode of section A of tube 326, interrupting the flow of current in the plate circuit of said tube and thus de-energizing relay 328 so that contacts 330, 332 close and complete a circuit through the count or ratchet operating coil 336 as hereinbefore stated. The condenser 350 across resistance 348 charges when tube 324 conducts current, and after said tube is cut off the charge across condenser 350 leaks off across resistor 348 and thereby maintains the grid of section A of tube 326 negatively biased and the circuit of the winding of relay 328 de-energized for a short period of time after light is restored to the photo-electric cell 44. This circuit provides a quick charge path and a slow discharge path for the condenser 350 and in this way a light interruption of short duration, when a drop of liquid passes between the photo-electric cell and the exciter lamp 46, is in effect prolonged for a sufficient length of time to enable the relay 328 to operate. The transformer secondary 352 provides a source of current for heating the filaments of tubes 324 and 326.

A step-down transformer 354 connected to supply lines L1 and L2 is provided for energizing the exciter lamp 46 and the winding of solenoid 290 which normally holds the liquid intercepting device 282 in its retracted position (Fig. 17) as described above.

Supply lines L1 and L2 are connected to a suitable source of 60-cycle alternating current through the main manually operable switch 356 which is mounted on the control panel 88. Said control panel is also provided with an electric receptacle or plug-in socket 358 to receive a plug terminal for supplying the operating current to the apparatus through said switch 356. The switch 268 which is normally closed but which is opened when post 30 turns to its end position at the completion of the operation of the apparatus, as described above with reference to Fig. 13, is also shown in Fig. 18.

Motor M is connected directly to line L1 by wire 360 and to line L2 through the switch 362 of the timing device or counter 320. Switch 362 has a stationary contact 364 which is connected to the motor by wire 366, and a companion movable contact 368 which is connected to line L2 by wire 370. Contact 368 is engaged with the companion contact 364 of switch 362 when the solenoid or clutch coil 372 of the timing device 320 is de-energized, and conversely, when said clutch coil is energized, the armature 374 which is then attracted by said clutch coil is operable to disengage contact 368 from contact 364 for opening switch 362, thus interrupting the supply of current to motor M. It will be noted that line L1 is connected to one terminal of clutch coil 372 by wire 376 and to one terminal of the count or ratchet-operating coil 336 by wire 376 and by wire 378. The other terminal of the clutch coil is connected to line L2 by wire 380 through switch 158, said switch and the companion switch 160 being connected to line L2 by the wire 382. The other terminal of the count or ratchet operating coil 336 is connected to the contact 330' of relay 28 by wire 384, and as pointed out above when contact 330 is engaged with contact 332' said other end of coil 336 is connected to line L2 for energizing said coil.

The timing device 320 includes a stationary contact 386 and a companion movable contact 388. These contacts are open when the clutch coil is de-energized and are closed when said clutch coil is energized, contact 388 being then moved to engage contact 386 by armature 374 of said clutch coil 372. It will be noted that contact 386 is connected to one terminal of the clutch coil and that movable contact 388 is connected to line L2 by wire 370 to complete a holding circuit for said clutch coil.

The operation of the apparatus will now be described with reference to Fig. 18, it being assumed that the post 30 has been set and knob 286 has been operated to actuate the indexing mechanism to determine the number of receptacles which are to be provided with liquid through the control unit 22 and that the knob 322 of the timing device or counter 320 has been set to determine the quantity of liquid to be supplied to each of said receptacles under the control of the photo-electric relay which is operable under the control of the photo-electric cell 44 in response to the movement of the drops of liquid from the funnel across the beam of light to said cell. When switch 356 is closed, motor M is connected across the lines L1 and L2 through switch 362 of the timing device 320 and operates to turn shaft 146. When shaft 146 has turned a short distance, start switch 158 is closed momentarily by cam 154 and completes the circuit through the clutch coil 372 so that said coil is energized and opens the switch 362, at the same time closing the contacts 386 and 388 providing a holding circuit for the clutch coil 372 independently of switch 158. Although switch 362 is opened when clutch coil 372 is thus energized, the motor continues to operate for a short time, since the circuit therethrough is held closed momentarily at the switch 160 closed by cam 156 which is set to close switch 160 shortly before switch 158 is actuated by cam 154 and then to open switch 160 a moment later, allowing one revolution of shaft 146 to take place. Motor M then stops and remains stationary until the count coil 336 has been energized a number of times corresponding to the setting of the knob 322 of the counter or timing device 320. After the predetermined number of pulses have been supplied to counter coil 336 under the control of relay 328, as described above, solenoid or clutch coil 372 is de-energized, contacts 386 and 388 being opened, and switch 362 is closed and the timer is automatically reset for the next operation. When contacts 386 and 388 are opened and clutch coil 372 is therefore de-energized switch 362 is closed, thus completing the circuit through motor M for operating shaft 146 through one revolution and thereby turning the rack one step by means of the Geneva gear movement described above with reference to Figs. 9 and 11. It will be understood that the time of each rack movement under the control of the photo-electric relay is less than the time between successive drops through outlet 25 of device 22, so that as soon as the last drop of one series passes into its receptacle, the next receptacle is in position to receive the first drop of the next series.

The operating cycle is repeated for each receptacle to be supplied with liquid, and it will be noted that during each movement of the rack under the control of count coil 336 in response to the operation of the impulse switch, i. e., contacts 330, 332 of the photo-electric relay, a corresponding movement is imparted to the indexing gear 192 and by the latter to the indexing gear 196 so that when the last receptacle has been supplied with liquid gear member 218 engages gear 224 for operating gear 198 whereby to turn the post 30 to its end position at which the normally closed switch 268 is opened, thus terminating the operation of the apparatus, even though switch 356 remains closed. It will be noted that when switch 268 is opened automatically at the end of the operation of the apparatus the winding of solenoid 290 is de-energized so that the liquid intercepting device 282 is moved by spring 296 to its liquid intercepting position at outlet 25 of the control unit, thus avoiding an oversupply of liquid to the last receptacle and also preventing overflow of said liquid in the apparatus. It will be apparent that when a drop-by-drop supply of liquid to the receptacles is not required or when a drop-by-drop count is not required or advantageous in timing the rest intervals of rack 10, any other suitable timing control of the operations of motor M may be provided; for example, the timing switch shown in the above mentioned patent operable by the synchronous or electric clock motor as described in said patent may be utilized for timing operations of motor M whereby to time the rest intervals of rack 10.

It will be observed that the provision for disengaging gear 198 from its driving connection with sleeve 93 of post 30 enables the latter to be moved for positioning unit 22 clear of the rack to a suitable position for convenience in adjusting the apparatus, including the drop-flow of the liquid, prior to setting the apparatus into operation for fraction collecting. It may be noted that the size of the liquid drop is determined by the outlet tip of funnel 40, said tip being so ground as to accurately pass a drop of a pre-determined size. It will be observed that the condenser lens 389 (Fig. 15) focusses the light from lamp 46 on the drop as the latter passes across the path of light from said lamp to cell 44.

It will be observed that the apparatus of the present invention is operable to supply an accurately measured quantity of liquid to each of a pre-determined large number of receptacles, without requiring the attention or presence of an attendant. Thus, for example once the operation of the apparatus has been initiated, it may be left operating, overnight if necessary, until all of the selected number of receptacles are supplied with liquid, at which time the operation is automatically terminated.

This is a division of my application Serial No. 772,389, filed September 5, 1947, now Patent No. 2,604,249, and assigned to the assignee of this application.

It will be understood that various changes in the details of construction and in the form and arrangement of parts may be made without departing from the underlying idea or principles of this invention within the scope of the appended claims.

I claim:

1. Apparatus of the character described, comprising a substance-supply unit mounted for turning movement from one position to another position, a gear operatively connected to said unit for turning the latter from said one position to said other position, and means for turning said gear and for preventing the same from turning between successive movements thereof, said means comprising a movable member having an edge extending in the direction of movement thereof and having a recess open at said edge, a gear member carried by said movable member at said recess, and a rotary gear mechanism having a gear in mesh with said first mentioned gear and positioned to mesh with said gear member and to be turned by the latter only at a predetermined point in the movement of said movable member, said gear mechanism having a second gear in fixed relation to said other gear thereof and having a smaller number of teeth than said other gear, said second gear having two teeth thereof in relatively movable contact with said edge whereby said two gears of said gear mechanism and said first mentioned gear are prevented from turning except when one of said two teeth is at said recess.

2. Apparatus of the character described, comprising a substance-supply unit mounted for turning movement from one position to another position, a gear operatively connected to said unit for turning the latter from said one position to said other position, and means for turning said gear and for preventing the same from turning between successive movements thereof, said means comprising a rotary member having a circular edge and a recess open at said edge, a gear mechanism mounted for turning movement about an axis located between the turning axis of said unit and the turning axis of said rotary member, said gear mechanism having a first gear in mesh with said first mentioned gear and a second gear in fixed co-axial relation with said first gear of said gear mechanism and having two teeth in relatively movable contact with said edge of said rotary member whereby said two gears of said gear mechanism are prevented from turning except when one of said two teeth is at said recess, and means carried by said rotary member for turning said gears of said gear mechanism when said one of said teeth is at said recess.

3. Apparatus of the character described, comprising a substance-supply unit, means mounting said unit for movement from one position to another position, means including a gear for moving said mounting means, means for operatively connecting said gear to said mounting means for moving said unit and for disconnecting said gear from its said operative connection with said mounting means whereby said unit may be moved independently of said gear for movement to either of said positions, mechanism operatively connected to said gear for turning the latter intermittently, and means included in said mechanism for preventing said gear from turning between successive turning movements thereof by said mechanism.

4. Apparatus of the character described, comprising a substance-supply unit, means mounting said unit for movement from one position to another position, means including a gear for moving said mounting means, means for operatively connecting said gear to said mounting means for moving said unit and for disconnecting said gear from its said operative connection with said mounting means whereby said unit may be moved independently of said gear for movement to either of said positions, mechanism operatively connected to said gear for turning the latter intermittently, and means included in said mechanism for preventing said gear from turning between successive turning movements thereof by said mechanism, said last mentioned means including two relatively movable members and a gear which is in mesh with said first mentioned gear and which is prevented from turning except in a predetermined position of one of said two relatively movable members in relation to the other of said two relatively movable members.

5. Apparatus of the character described, comprising a substance-supply unit, means mounting said unit for movement from one position to another position, means including a gear for moving said mounting means, means for operatively connecting said gear to said mounting means for moving said unit and for disconnecting said gear from its said operative connection with said mounting means whereby said unit may be moved independently of said gear for movement to either of said positions, mechanism operatively connected to said gear for turning the latter intermittently, and means included in said mechanism for preventing said gear from turning between successive turning movements thereof by said mechanism, said last mentioned means including two relatively movable members and a gear which is in mesh with said first mentioned gear and which is prevented from turning except in a predetermined position of one of said two relatively movable members in relation to the other of said two relatively movable members, and indexing means for moving one of said two relatively movable members in relation to the other for predetermining the time of actuation of said first mentioned gear by said mechanism.

6. Apparatus of the character described, comprising a gear unit mounted for rotation and for movement longitudinally of its axis from one position to another position, a receptacle rack mounted for movement, means for operatively connecting said rack releasably to said gear unit in one of said positions thereof for actuation by said gear unit, power-operated means releasably connected to said gear unit for turning the same in said one position thereof, and indexing means including a gear in mesh with a gear of said unit for turning said unit when the latter is disconnected from said power-operated means, said indexing gear being in mesh with said gear of said gear unit in both of said positions thereof whereby said indexing means is actuated by said gear unit when the latter is connected to said power-operated means.

7. Apparatus of the character described, comprising a gear unit mounted for rotation and for movement longitudinally of its axis from one position to another position, a receptacle rack mounted for movement, means for operatively connecting said rack releasably to said gear unit in one of said positions thereof for actuation by said gear unit, means releasably connected to said gear unit for turning the same in said one position thereof, power-operated mechanism for actuating said gear-unit turning means intermittently, step by step, and indexing means including a gear in mesh with a gear of said unit for turning said unit when the latter is disconnected from said gear-unit turning means, said indexing gear being in mesh with said gear of said gear unit in both of said positions thereof whereby said indexing means is actuated by said gear unit when the latter is connected to said gear-unit turning means.

8. Apparatus of the character described, comprising a gear unit mounted for rotation and for movement longitudinally of its axis from one position to another position, a receptacle rack mounted for movement, means for operatively connecting said rack releasably to said gear unit in one of said positions thereof for actuation by said gear unit, means releasably connected to said gear unit for turning the same in said one position thereof, power-operated mechanism for actuating said gear-unit turning means intermittently, step by step, and indexing means including a gear in mesh with a gear of said unit for turning said unit when the latter is disconnected from said gear-unit turning means, said indexing gear being in mesh with said gear of said gear unit in both of said positions thereof whereby said indexing means is actuated by said gear unit when the latter is connected to said gear-unit turning means, an electric motor for operating said power-operated mechanism, a control circuit for said motor including control means for energizing said motor a predetermined number of times, once for each operation of said mechanism, at time-spaced intervals, and means operable under the control of said indexing means after said predetermined number of energizations of said motor to render said control circuit and control means ineffective to energize said motor.

9. Apparatus of the character described, comprising a unit mounted for rotation and for longitudinal movement from one position to another, said unit being adapted to drive a receptacle carrier, power-operated mechanism operatively connected to said unit in one of said positions for rotating said unit and operatively disconnected from said unit in said other position thereof, means actuated by said unit when the latter is in said one of said positions, indexing means connected to said unit for rotating the latter when it is in said other position thereof, said indexing means being operatively connected to said unit for actuation by the latter when said unit is rotated by said power actuated means, and means operable under the control of said indexing means, after a predetermined operation thereof by said unit, to terminate the operations of said power-operated means.

10. Apparatus of the character described, comprising a unit mounted for rotation and for longitudinal movement from one position to another, said unit being adapted to drive a receptacle carrier, power-operated mechanism operatively connected to said unit in one of said positions for rotating said unit and operatively disconnected from said unit in said other position thereof, means actuated by said unit when the latter is in said one of said positions, indexing means connected to said unit for rotating the latter when it is in said other position thereof, said indexing means being operatively connected to said unit for actuation by the latter when said unit is rotated by said power actuated means, an electric motor for operating said power-operated mechanism, a control circuit for said motor including control means for energizing said motor a predetermined number of times, once for each operation of said mechanism, at time-spaced intervals, and means operable under the control of said indexing means, after a predetermined number of operations thereof by said unit, to render said control circuit and control devices ineffective to energize said motor.

11. Apparatus of the character described, comprising a device having a material-supply passage, means mounting said device for movement from one position to another, means for moving said mounting means including a member mounted for movement, mechanism in operative engagement with said mounting means and operable by said member, means for disengaging said operative engagement whereby said device may be moved independently of said mechanism and said member for movement to either of said positions, mechanism operatively connected to said member for moving the latter intermittently, and means for preventing said member from moving between successive movements thereof by said latter mechanism.

12. Apparatus of the character described, comprising a device having a material-supply passage, means mounting said device for movement from one position to another, means for moving said mounting means including a member mounted for turning movement, mechanism in operative engagement with said mounting means and operable by said member, means for disengaging said operative engagement whereby said device may be moved independently of said mechanism and said member for movement to either of said positions, mechanism operatively connected to said member for turning the latter intermittently, and means for preventing said member from turning between successive turning movements thereof by said latter mechanism.

13. Apparatus of the character described, comprising a device having a material-supply passage, means mounting said device for movement from one position to another, means for moving said mounting means including a rotary member mounted for turning movement, mechanism in operative engagement with said mounting means and operable by said rotary member, means for disengaging said operative engagement whereby said device may be moved independently of said mechanism and said member for movement to either of said positions, mechanism operatively connected to said member for turning the latter intermittently, and means for preventing said member from turning between successive turning movements thereof by said latter mechanism.

14. Apparatus of the character described, comprising a device having a material-supply passage, means mounting said device for movement from one position to another, means including a gear for moving said mounting means, means for operatively connecting said gear to said mounting means for moving said device and for disconnecting said gear from its said operative connection with said mounting means whereby said device may be moved independently of said gear for movement to either of said positions, mechanism operatively connected to said gear for turning the latter intermittently, and means included in said mechanism for preventing said gear from turning between successive turning movements thereof by said mechanism.

15. Apparatus of the character described, comprising a device having a material-supply passage, means mounting said device for movement from one position to another, means including a gear for moving said mounting means, means for operatively connecting said gear to said mounting means for moving said device and for disconnecting said gear from its said operative connection with said mounting means whereby said device may be moved independently of said gear for movement to either of said positions, mechanism operatively connected to said gear for turning the latter intermittently, and means included in said mechanism for preventing said gear from turning between successive turning movements thereof by said mechanism, said latter means comprising a movable member having an edge extending in the direction of movement thereof and having a recess open at said edge, a gear member carried by said movable member at said recess, and a rotary gear mechanism having a gear in mesh with said first mentioned gear and positioned to mesh with said gear member and to be turned by the latter only at a predetermined point in the movement of said movable member, said gear mechanism having a second gear in fixed relation to said other gear thereof and having a smaller number of teeth than said other gear, said second gear having two teeth thereof in relatively movable contact with said edge whereby said two gears of said gear mechanism and said first mentioned gear are prevented from turning except when one of said two teeth is at said recess.

16. Apparatus of the character described, comprising a device having a material-supply passage and mounted for movement from one position to another position, means including a gear for moving said device, mechanism operatively connected to said gear for turning the latter intermittently, and means included in said mechanism for preventing said gear from turning between successive turning movements thereof by said mechanism, said preventing means including a movable member having an edge extending in the direction of movement thereof and having a recess open at said edge, and a gear device engaged with said first mentioned gear and having two teeth thereof in relatively movable contact with said edge whereby said gear device is prevented from turning except when one of said two teeth is at said recess.

17. Apparatus of the character described, comprising a device having a material-supply passage, and mounted for movement from one position to another position, means for moving said device including a member mounted for movement, mechanism operatively connected to said member for moving the latter intermittently, and means included in said mechanism for preventing said member from moving between successive movements thereof by said mechanism, said preventing means including an additional movable member having an edge extending in the direction of movement thereof and having a recess open at said edge, and a gear device interengaged between said members and having two teeth thereof in relatively movable contact with said edge whereby said gear device is prevented from turning except when one of said two teeth is at said recess.

18. Apparatus of the character described, comprising a receptacle rack mounted for movement, a device having a material-supply passage and mounted for movement from one position to another position relative to said rack, a gear unit mounted for rotation and for movement longitudinally of its axis from one position to another position, means for operatively connecting said rack releasably to said gear unit in one of said positions thereof for actuation by said gear unit, power-operated means releasably connected to said gear unit for turning the same in said one position thereof, and indexing means including a gear in mesh with a gear of said unit for turning said unit when the latter is disconnected from said power-operated means, said indexing gear being in mesh with said gear of said gear unit in both of said positions thereof whereby said indexing means is actuated by said gear unit when the latter is connected to said power-operated means, a gear operatively connected to said device for turning the latter from said one position thereof to said other position thereof, and means for turning said last mentioned gear and for preventing the same from turning between successive movements thereof, said last mentioned means comprising a movable member operatively connected to said indexing gear for movement in response to the rotation of said first mentioned gear unit, said movable member having an edge extending in the direction of movement thereof and having a recess open at said edge, a gear member carried by said movable member at said recess, and a rotary gear mechanism having a gear in mesh with the gear operatively connected to said device and positioned to mesh with said gear member and to be turned by the latter only at a predetermined point in the movement of said movable member, said gear mechanism having a second gear in fixed relation to said other gear thereof and having a smaller number of teeth than said other gear, said second gear having two teeth thereof in relatively movable contact with said edge whereby said two gears of said gear mechanism and the gear operatively connected to said device are prevented from turning except when one of said two teeth is at said recess.

19. Apparatus of the character described, comprising a material-supply device mounted for turning movement from one position to another position, a gear operatively connected to said device for turning the latter from said one position to said other position, and means for turning said gear and for preventing the same from turning between successive movements thereof, said means comprising a movable member having an edge extending in the direction of movement thereof and having a recess open at said edge, a gear member carried by said movable member at said recess, and a rotary gear mechanism having a gear in mesh with said first mentioned gear and positioned to mesh with said gear member and to be turned by the latter only at a predetermined point in the movement of said movable member, said gear mechanism having a second gear in fixed relation to said other gear thereof and having a smaller number of teeth than said other gear, said second gear having two teeth thereof in relatively movable contact with said edge whereby said two gears of said gear mechanism and said first mentioned gear are prevented from turning except when one of said two teeth is at said recess.

GEORGE GORHAM.

References Cited in the file of this patent

UNITED STATES PATENTS

| Number | Name | Date |
|---|---|---|
| 1,767,620 | Seeger | June 24, 1930 |
| 2,290,626 | Bosomworth | July 21, 1942 |
| 2,418,701 | Davis | Apr. 8, 1947 |
| 2,540,224 | Vasselli | Feb. 6, 1951 |

FOREIGN PATENTS

| Number | Country | Date |
|---|---|---|
| 617,253 | Great Britain | Feb. 3, 1949 |
| 757,832 | France | Oct. 16, 1933 |